(12) United States Patent
Wu et al.

(10) Patent No.: US 11,636,811 B2
(45) Date of Patent: Apr. 25, 2023

(54) DATA BURNING METHOD AND DATA BURNING DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Guoqiang Wu, Beijing (CN); Chuanyan Lan, Beijing (CN); Yong Yu, Beijing (CN); Taehyun Kim, Beijing (CN); Lianbin Liu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 353 days.

(21) Appl. No.: 16/346,104

(22) PCT Filed: Aug. 30, 2018

(86) PCT No.: PCT/CN2018/103144
§ 371 (c)(1),
(2) Date: Apr. 29, 2019

(87) PCT Pub. No.: WO2019/109679
PCT Pub. Date: Jun. 13, 2019

(65) Prior Publication Data
US 2019/0259340 A1 Aug. 22, 2019

(30) Foreign Application Priority Data
Dec. 8, 2017 (CN) .......................... 201711292599.0

(51) Int. Cl.
G09G 3/32 (2016.01)
G06F 13/16 (2006.01)
(Continued)

(52) U.S. Cl.
CPC ........... G09G 3/3275 (2013.01); G06F 8/654 (2018.02); G06F 13/1689 (2013.01); G06F 13/4282 (2013.01)

(58) Field of Classification Search
CPC ... G09G 3/3275; G06F 8/654; G06F 13/1689; G06F 13/4282
See application file for complete search history.

(56) References Cited

U.S. PATENT DOCUMENTS

2007/0075977 A1* 4/2007 Chen ................... G06F 3/04166
345/173
2007/0174418 A1 7/2007 Garcia, Jr. et al.
(Continued)

FOREIGN PATENT DOCUMENTS

CN 104008736 A 8/2014
CN 104932207 A 9/2015
(Continued)

OTHER PUBLICATIONS

International Search Report and English Translation of the Box V of the Written Opinion dated Jun. 14, 2018, received for corresponding PCT Application No. PCT/2018/103144.
(Continued)

*Primary Examiner* — Henry Tsai
*Assistant Examiner* — Harry Z Wang
(74) *Attorney, Agent, or Firm* — Kinney & Lange, P.A.

(57) ABSTRACT

The preset disclosure provides a data burning method and a data burning device. The data burning method comprises receiving a differential signal data packet, which is transmitted by a signal generator, by a driver IC through a
(Continued)

differential signal interface, the differential signal data packet including grayscale data; parsing the differential signal data packet by the driver IC to obtain the grayscale data; and burning the grayscale data to a memory by the driver IC.

7 Claims, 2 Drawing Sheets

(51) Int. Cl.
  *G06F 13/42* (2006.01)
  *G09G 3/3275* (2016.01)
  *G06F 8/654* (2018.01)

(56) References Cited

U.S. PATENT DOCUMENTS

| | | | |
|---|---|---|---|
| 2008/0198115 A1* | 8/2008 | Lin | G09G 3/3648 345/89 |
| 2011/0025699 A1* | 2/2011 | Ogawa | G09G 3/2096 345/531 |
| 2011/0206290 A1* | 8/2011 | Katayama | H04N 19/60 382/250 |
| 2016/0086573 A1* | 3/2016 | Chang | H04N 1/644 345/590 |
| 2016/0148582 A1* | 5/2016 | Chung | G09G 3/3611 345/89 |
| 2016/0293096 A1* | 10/2016 | Nose | G09G 3/2092 |
| 2017/0140692 A1 | 5/2017 | Xiong et al. | |
| 2018/0018497 A1* | 1/2018 | Zheng | G06V 40/1359 |
| 2018/0061307 A1* | 3/2018 | Inoue | H03F 3/68 |
| 2018/0191371 A1* | 7/2018 | Tao | H03M 7/3062 |
| 2018/0373078 A1* | 12/2018 | Mizuno | G09G 3/20 |
| 2019/0130845 A1* | 5/2019 | Han | G09G 3/3266 |

FOREIGN PATENT DOCUMENTS

| | | | |
|---|---|---|---|
| CN | 104992683 A | 10/2015 | |
| CN | 106228924 A | 12/2016 | |
| CN | 106547171 A | 3/2017 | |
| CN | 106847224 A | 6/2017 | |
| CN | 106933603 A | 7/2017 | |
| CN | 17358127 A | 11/2017 | |
| CN | 107967144 A | 4/2018 | |
| KR | 20190049990 A | * 5/2019 | G09G 3/20 |

OTHER PUBLICATIONS

First Chinese Office Action dated Feb. 25, 2020, received for corresponding Chinese Application No. 201711292599.0, 11 pages.

* cited by examiner

US 11,636,811 B2

DATA BURNING METHOD AND DATA BURNING DEVICE

CROSS-REFERENCE TO RELATED APPLICATION

This application is the U.S. national phase of PCT Application No. PCT/CN2018/103144 filed on Aug. 30, 2018, which claims priority to Chinese Patent Application No. 201711292599.0 filed on Dec. 8, 2017, the disclosures of which are incorporated in their entirety by reference herein.

TECHNICAL FIELD

The present disclosure relates to the field of liquid crystal display technology, and in particular to a data burning method and a data burning device.

BACKGROUND

With the development of display technology, a display module is capable of supporting a memory, for example, an active-matrix organic light emitting diode (AMOLED) module may include a memory, such as a flash memory. In practical application, data may be burnt onto the memory of the display module, so as to enable the display module to perform specific functions based on the data in the memory. A burning method in related art includes burning data from a signal generator onto the memory of the display module directly through a serial peripheral interface (SPI) signal.

SUMMARY

The present disclosure provides a data burning method and a data burning device.

The present disclosure provides a data burning method applied to a display module including a driver IC and a memory, the method comprising:
receiving a differential signal data packet, which is transmitted by a signal generator, by the driver IC through a differential signal interface, the differential signal data packet including grayscale data;
parsing the differential signal data packet by the driver IC to obtain the grayscale data; and
burning the grayscale data to the memory by the driver IC.

Optionally, the driver IC is connected with the memory through SPI transmission lines, and the step of burning the grayscale data to the memory by the driver IC comprises:
packaging the grayscale data into an SPI data packet and burning the grayscale data in the SPI data packet to the memory through the SPI transmission lines by the driver IC.

Optionally, the step of parsing the differential signal data packet by the driver IC to obtain the grayscale data comprises:
parsing the differential signal data packet to obtain the grayscale data and storing the grayscale data in a register of the driver IC by the driver IC.

Optionally, the step of packaging the grayscale data into an SPI data packet and burning the grayscale data in the SPI data packet to the memory through the SPI transmission lines by the driver IC comprises:
after a mobile industry processor interface (MIPI) data packet of the signal generator is sent, packaging the grayscale data stored in the register into an SPI data packet and burning the grayscale data in the SPI data packet to the memory through the SPI transmission lines by the driver IC.

Optionally, the step of packaging the grayscale data into an SPI data packet and burning the grayscale data in the SPI data packet to the memory through the SPI transmission lines by the driver IC comprises:
after a burning instruction is received by the driver IC, packaging the grayscale data stored in the register into an SPI data packet and burning the grayscale data in the SPI data packet to the memory through the SPI transmission lines by the driver IC.

Optionally, the differential signal interface is an MIPI, and the differential signal data packet is an MIPI data packet.

The present disclosure further provides a data burning device applied to a display module including a driver IC and a memory, the data burning device comprising:
a receiving module for receiving a differential signal data packet, which is transmitted by a signal generator, through a differential signal interface, the differential signal data packet including grayscale data;
a parsing module for parsing the differential signal data packet to obtain the grayscale data; and
a burning module for burning the grayscale data to the memory.

Optionally, the driver IC is connected with the memory through SPI transmission lines, and the burning module is configured to package the grayscale data into an SPI data packet, and burn the grayscale data in the SPI data packet to the memory through the SPI transmission lines.

Optionally, the parsing module is configured to parse the differential signal data packet to obtain the grayscale data, and store the grayscale data in a register of the driver IC.

Optionally, the burning module is configured to, after an MIPI data packet of the signal generator is sent, package the grayscale data stored in the register into an SPI data packet, and burn the grayscale data in the SPI data packet to the memory through the SPI transmission lines.

Optionally, the parsing module is configured to, after a burning instruction is received by the driver IC, package the grayscale data stored in the register into an SPI data packet, and burn the grayscale data in the SPI data packet to the memory through the SPI transmission lines.

Optionally, the differential signal interface is an MIPI, and the differential signal data packet is an MIPI data packet.

The present disclosure further provides a data burning device, comprising a memory, a driver IC, and computer programs which are stored in the memory and capable of being executed by the driver IC; wherein the driver IC performs the aforesaid data burning method when executing the programs.

The present disclosure further provides a computer readable storage medium with computer programs stored thereon, wherein the steps of the aforesaid data burning method are performed when the programs are executed by a driver IC.

DETAILED DESCRIPTION

For clearly illustrating a technical problem to be solved by the present disclosure, and technical solutions and advantages of the present disclosure, detailed description will be provided below in conjunction with the drawings and specific implementations.

Figure 1:
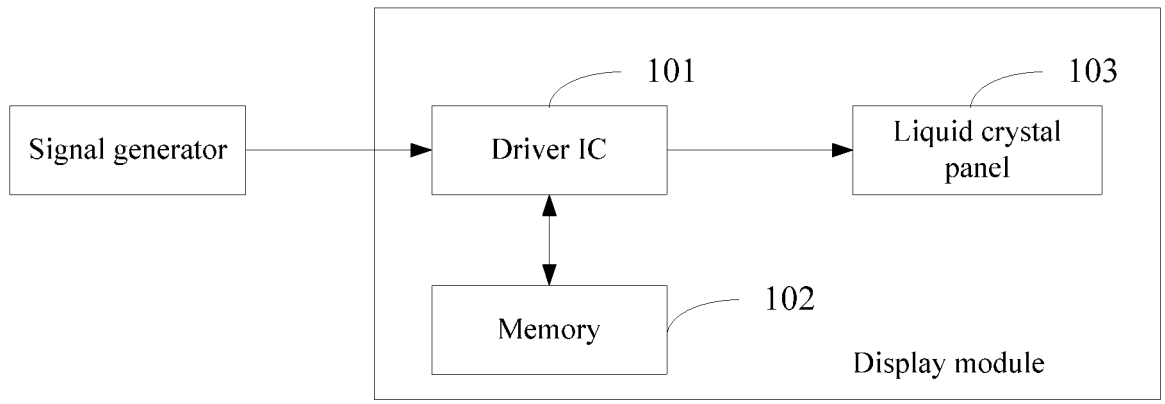
FIG. 1 is a circuit diagram of a display module provided by some embodiments of the present disclosure.

As shown in FIG. 1 which is a circuit diagram of a display module provided by some embodiments of the present disclosure, the display module may comprise a driver IC 101, a memory 102 and a liquid crystal panel 103. The driver IC 101 is connected with a signal generator for acquiring data from the signal generator, and is also connected with the memory 102 for writing data to the memory 102 and reading data from the memory 102; moreover, the driver IC 101 may further be connected with the liquid crystal panel 103 for driving the liquid crystal panel 103 based on the data.

Wherein, the memory 102 may be a flash memory, which is not limited by the present disclosure. Optionally, in some embodiments of the present disclosure, the driver IC 101 may be connected with the memory 102 through SPI transmission lines, which is not limited by the present disclosure. The liquid crystal panel 103 may be an AMOLED panel, or other panel, such as an in-plane switching (IPS) panel, which is not limited by the present disclosure.

Furthermore, the driver IC 101 may further comprise a differential signal interface configured to be connected with the signal generator external to the display module, wherein, the signal generator may be represented by a microcontroller unit (MCU) in FIG. 1 which belongs to the signal generator. In some embodiments of the present disclosure, the signal generator may be called an access point (AP), or a system terminal. Optionally, in some embodiments of the present disclosure, the differential signal interface may be an MIPI, that is, connect the driver IC 101 may be connected with the signal generator through the MIPI. However, the present disclosure is not limited to those specific embodiments. For example, the differential signal interface may be other suitable differential signal circuit interface.

Figure 2:
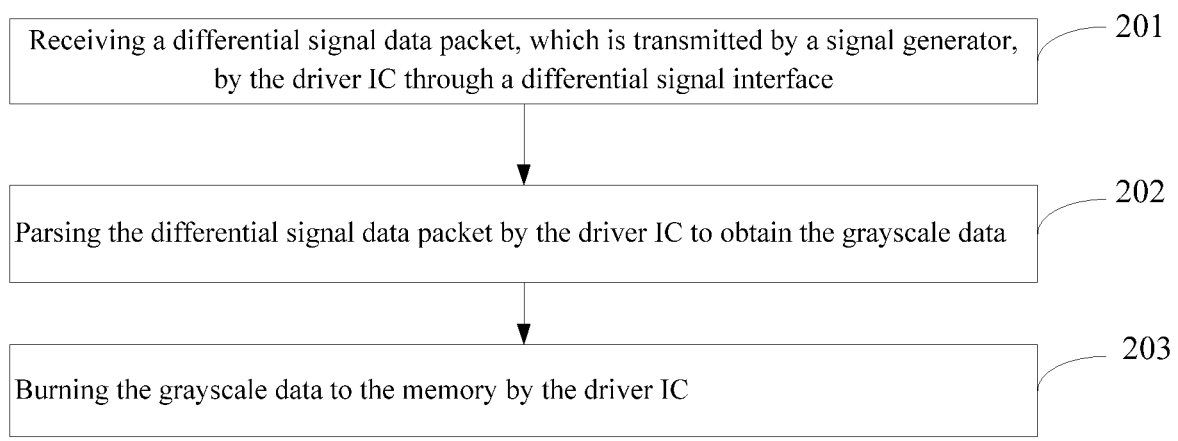
FIG. 2 is a flow chart illustrating a data burning method provided by some embodiments of the present disclosure.

With reference to FIG. 2 which is a flow chart illustrating a data burning method provided by some embodiments of the present disclosure, the method is applied to a display module which may include a driver IC and a memory. As shown in FIG. 2, the data burning method may comprise Steps 201 to 203.

Step 201, a differential signal data packet, which is transmitted by a signal generator, is received by the driver IC through a differential signal interface, and the differential signal data packet may include grayscale data.

Step 202, the differential signal data packet is parsed by the driver IC to obtain the grayscale data.

Step 203, the grayscale data is burnt to the memory by the driver IC.

Wherein, Step 201 may be executed during a test process of the display module by causing the driver IC to receive the differential signal data packet, which is transmitted by the signal generator through the differential signal interface. The grayscale data may be generated by the display module during product testing. Optionally, the grayscale data may be a low grayscale Demura data which is also called grayscale vertical stripe data.

Moreover, after receiving the differential signal data packet, the driver IC may parse the differential signal data packet to obtain the grayscale data, and burn the grayscale data to the memory.

Through the above steps, the differential signal data packet transmitted by the signal generator may be received through the differential signal interface; since the differential signal interface only needs two transmission lines, data transmission stability may be improved and data transmission errors may be reduced. Moreover, the SPI transmission lines between the signal generator and the memory may be reduced.

It should be noted that the above method may be applied to a product testing process of the display module.

In some embodiments of the present disclosure, the driver IC is connected with the memory through SPI transmission lines, and the step of burning the grayscale data to the memory by the driver IC may comprise packaging the grayscale data into an SPI data packet and burning the grayscale data in the SPI data packet to the memory through the transmission lines by the driver IC.

In the above embodiments, the driver IC is connected with the memory through the SPI transmission lines; since both the driver IC and the memory are internal components of the display module with a short distance therebetween, and the shorter a transmission distance of the SPI transmission lines, the higher a transmission speed of the SPI transmission lines, so that a data burning speed may be increased. Moreover, since both the driver IC and the memory are internal components of the display module, SPIs of a uniform standard, such as high-speed SPIs, may be used between the driver IC and the memory, which may further increase the data burning speed.

Moreover, in the above embodiments, the step of parsing the differential signal data packet by the driver IC to obtain the grayscale data may comprise parsing the differential signal data packet to obtain the grayscale data and storing the grayscale data in a register of the driver IC by the driver IC.

Optionally, the step of packaging the grayscale data into an SPI data packet and burning the grayscale data in the SPI data packet to the memory through the SPI transmission lines by the driver IC may comprise, after an MIPI data packet of the signal generator is sent, packaging the grayscale data stored in the register into an SPI data packet and burning the grayscale data in the SPI data packet to the memory through the SPI transmission lines by the driver IC.

Through the above steps, after receiving the differential signal data packet transmitted by the signal generator, the driver IC parses the differential signal data packet, and stores the grayscale data obtained by the parsing process in the register of the driver IC, packages the grayscale data stored in the register into an SPI data packet after an MIPI data packet of the signal generator is sent, and burns the grayscale data in the SPI data packet to the memory through the SPI transmission lines. In this way, it is possible to avoid burning interruption caused by a mismatch between a speed of receiving the differential signal data packet transmitted by the signal generator and a speed of burning the grayscale data to the memory, thereby improving stability of grayscale data burning.

Of course, the step of parsing the differential signal data packet by the driver IC to obtain the grayscale data may comprise parsing the differential signal data packet to obtain the grayscale data and storing the grayscale data in a register of the driver IC by the driver IC.

Optionally, the step of packaging the grayscale data into an SPI data packet and burning the grayscale data in the SPI data packet to the memory through the SPI transmission lines by the driver IC may comprise, after the driver IC receives a burning instruction, packaging the grayscale data stored in the register into an SPI data packet and burning the grayscale data in the SPI data packet to the memory through the SPI transmission lines by the driver IC.

Through the above steps, the grayscale data obtained by the parsing process is stored in the register of the driver IC at first, and after a burning instruction is received, the stored grayscale data is packaged into an SPI data packet, and the grayscale data in the SPI data packet is burnt to the memory through the SPI transmission lines. In such a way, a burning process may be flexibly performed according to the burning instruction, which improves flexibility of data burning. Furthermore, the burning instruction may be a command sent by a controller of the display module or a test control center, and may include relevant information such as start time of burning, contents of burning, and end time of burning.

Moreover, in some embodiments of the present disclosure, the differential signal interface is an MIPI, and the differential signal data packet is an MIPI data packet.

Wherein, the MIPI has a transmission speed of up to several hundred MHz, and is a differential signal interface which only needs two transmission lines, so that a data transmission speed may be increased based upon the characteristics of the MIPI, thereby increasing the data burning speed and improving the stability of data burning.

In some embodiments of the present disclosure, the driver IC receives the differential signal data packet, which is transmitted by the signal generator, through the differential signal interface, and the differential signal data packet may include grayscale data; the driver IC parses the the differential signal data packet to obtain the grayscale data; and the driver IC burns the grayscale data to the memory. The differential signal interface only needs two signal lines, so that the stability of transmission of the burnt data may be improved.

Figure 3:
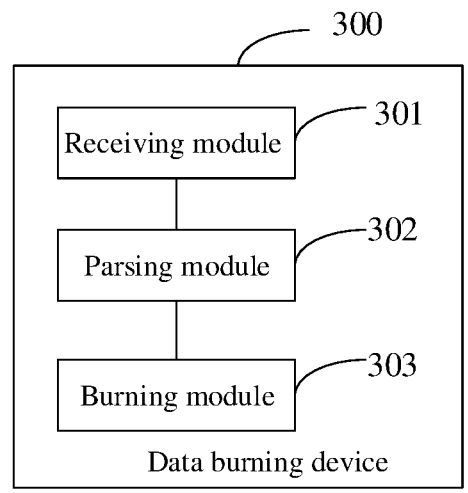
FIG. 3 is a schematic structural diagram of one data burning device provided by some embodiments of the present disclosure.

With reference to FIG. 3 which is a schematic structural diagram of one data burning device provided by some embodiments of the present disclosure, the device is applied to a display module comprising a driver IC and a memory. As shown in FIG. 3, a data burning device 300 may comprise a receiving module 301, a parsing module 302 and a burning module 303. The receiving module 301 has one terminal connected with a signal generator (not shown), and the other terminal connected with the parsing module 302, and may be configured to receive a differential signal data packet, which is transmitted by the signal generator and includes grayscale data, through a differential signal interface, and send the differential signal data packet to the parsing module 302; the parsing module 302 has one terminal connected with the receiving module 301, and the other terminal connected with the burning module 303, and may be configured to parse the differential signal data packet to obtain the grayscale data, and send the grayscale data to the burning module 303; and the burning module 303 may be configured to burn the grayscale data to the memory.

Optionally, the driver IC may be connected with the memory through SPI transmission lines, and the burning module 303 may be configured to package the grayscale data into an SPI data packet, and burn the grayscale data in the SPI data packet to the memory through the SPI transmission lines.

Optionally, the parsing module 302 may be configured to parse the differential signal data packet to obtain the grayscale data, and store the grayscale data in a register of the driver IC.

The burning module 303 may be configured to, after an MIPI data packet of the signal generator is sent, package the grayscale data stored in the register into an SPI data packet, and burn the grayscale data in the SPI data packet to the memory through the SPI transmission lines.

Optionally, the parsing module 302 may be configured to parse the differential signal data packet to obtain the grayscale data, and store the grayscale data in a register of the driver IC. The burning module 303 may be configured to, after the driver IC receives a burning instruction, package the grayscale data stored in the register into an SPI data packet, and burn the grayscale data in the SPI data packet to the memory through the SPI transmission lines.

Optionally, the differential signal interface may be an MIPI, and the differential signal data packet may be an MIPI data packet.

In some embodiments of the present disclosure, every step according to the method embodiments as shown in FIG. 2 may be implemented by the above data burning device, and thus will not be repeated herein. The data burning device may improve the stability of transmission of the burnt data.

Figure 4:
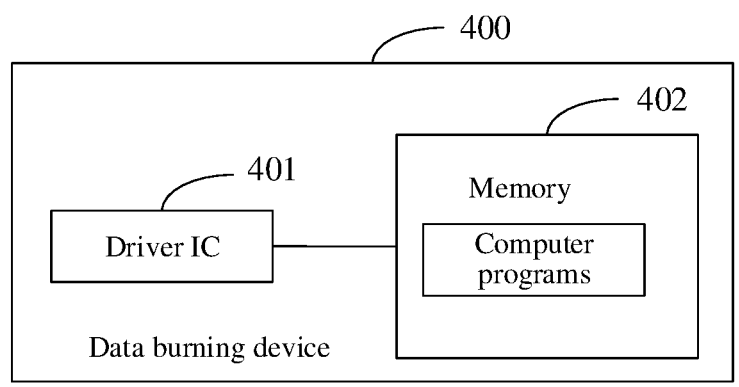
FIG. 4 is a schematic structural diagram of another data burning device provided by some embodiments of the present disclosure.

With reference to FIG. 4 which is a schematic structural diagram of the other data burning device provided by some embodiments of the present disclosure, a data burning device 400 may comprise a memory 402, a driver IC 401, and computer programs which are stored in the memory 402 and capable of being executed by the driver IC 401, wherein the driver IC 401 may perform the following steps by executing the programs: receiving a differential signal data packet, which is transmitted by a signal generator, through a differential signal interface, the differential signal data packet including grayscale data; parsing the differential signal data packet to obtain the grayscale data; and burning the grayscale data to the memory 402.

Optionally, the driver IC 401 is connected with the memory 402 through SPI transmission lines, and the step of burning the grayscale data to the memory 402 by the driver IC 401 may comprise packaging the grayscale data into an SPI data packet, and burning the grayscale data in the SPI data packet to the memory 402 through the SPI transmission lines.

Optionally, the step of parsing the differential signal data packet to obtain the grayscale data by the driver IC 401 may comprise parsing the differential signal data packet to obtain the grayscale data, and storing the grayscale data in a register of the driver IC 401.

Optionally, the step of packaging the grayscale data into an SPI data packet, and burning the grayscale data in the SPI data packet to the memory 402 through the SPI transmission lines by the driver IC 401 may comprise, after an MIPI data packet of the signal generator is sent, packaging the grayscale data stored in the register into an SPI data packet, and burning the grayscale data in the SPI data packet to the memory 402 through the SPI transmission lines.

Optionally, the step of parsing the differential signal data packet to obtain the grayscale data by the driver IC 401 may comprise parsing the differential signal data packet to obtain the grayscale data, and storing the grayscale data in a register of the driver IC 401.

The step of packaging the grayscale data into an SPI data packet, and burning the grayscale data in the SPI data packet to the memory 402 through the SPI transmission lines by the driver IC 401 may comprise, if the driver IC 401 receives a burning instruction, packaging the grayscale data stored in the register into an SPI data packet, and burning the grayscale data in the SPI data packet to the memory 402 through the SPI transmission lines.

Optionally, the differential signal interface may be an MIPI, and the differential signal data packet may be an MIPI data packet.

In some embodiments of the present disclosure, every step according to the method embodiments as shown in FIG. 2 may be implemented by the above data burning device, and thus will not be repeated herein. The data burning device may improve the stability of transmission of the burnt data.

Furthermore, some embodiments of the present disclosure further provide a computer readable storage medium with computer programs stored thereon, and the steps of the data burning method according to some embodiments of the present disclosure are performed when the programs are executed by a driver IC.

The above is optional embodiments of the present disclosure. It should be noted that those of ordinary skill in the art may make various improvements and modifications without departing from the principle of the present disclosure, and these improvements and modifications shall be considered to fall into the protection scope of the present disclosure

What is claimed is:

1. A data burning method, performed by a display module including a driver Integrated Circuit (IC) and a memory that are internal components of the display module, the driver IC being connected with the memory through serial peripheral interface (SPI) transmission lines, the method comprising:
    receiving, by the driver IC, a differential signal data packet from a signal generator, through a differential signal interface, the differential signal data packet comprising grayscale data, wherein the differential signal interface is a mobile industry processor interface (MIPI), and the differential signal data packet is an MIPI data packet;
    parsing, by the driver IC, the differential signal data packet to obtain the grayscale data and storing the grayscale data in a register of the driver IC;
    packaging, by the driver IC, the grayscale data of the register of the driver IC into an SPI data packet; and
    burning the grayscale data in the SPI data packet to the memory through the SPI transmission lines,
    wherein the grayscale data comprises grayscale vertical stripe (Demura) data provided for testing of the display module, and the memory comprises a Flash memory.

2. The data burning method according to claim 1, wherein packaging, by the driver IC, the grayscale data into the SPI data packet and burning the grayscale data in the SPI data packet to the memory through the SPI transmission lines comprises:
    after an MIPI data packet of the signal generator is sent, packaging, by the driver IC, the grayscale data stored in the register into the SPI data packet and burning the grayscale data in the SPI data packet to the memory through the SPI transmission lines.

3. The data burning method according to claim 1, wherein packaging, by the driver IC, the grayscale data into the SPI data packet and burning the grayscale data in the SPI data packet to the memory through the SPI transmission lines comprises:
    after a burning instruction is received by the driver IC, packaging, by the driver IC, the grayscale data stored in the register into the SPI data packet and burning the grayscale data in the SPI data packet to the memory through the SPI transmission lines.

4. A data burning device, comprising internal components that include a memory, a driver IC, and computer programs which are stored in the memory and capable of being executed by the driver IC, the driver IC and the memory being connected through serial peripheral interface (SPI) transmission lines; wherein:
    the driver IC is configured to implement a data burning method when executing the computer programs, and the data burning method comprises:
        receiving, by the driver IC, a differential signal data packet from a signal generator, through a differential signal interface, the differential signal data packet comprising grayscale data, wherein the differential signal interface is a mobile industry processor interface (MIPI), and the differential signal data packet is an MIPI data packet, the grayscale data comprises grayscale vertical stripe (Demura) data provided for testing of a display module;
        parsing, by the driver IC, the differential signal data packet to obtain the grayscale data and storing the grayscale data in a register of the driver IC;
        packaging, by the driver IC, the grayscale data of the register of the driver IC into an SPI data packet; and
        burning the grayscale data in the SPI data packet to the memory through the SPI transmission lines.

5. A non-transitory computer readable storage medium with computer programs stored thereon, wherein the computer programs are executed by a driver IC so as to perform the steps of the data burning method according to claim 1.

6. The data burning device according to claim 4, wherein the packaging, by the driver IC, the grayscale data into the SPI data packet and burning the grayscale data in the SPI data packet to the memory through the SPI transmission lines comprises:
    after an MIPI data packet of the signal generator is sent, packaging, by the driver IC, the grayscale data stored in the register into the SPI data packet and burning the grayscale data in the SPI data packet to the memory through the SPI transmission lines.

7. The data burning device according to claim 4, wherein the packaging, by the driver IC, the grayscale data into the SPI data packet and burning the grayscale data in the SPI data packet to the memory through the SPI transmission lines comprises:
    after a burning instruction is received by the driver IC, packaging, by the driver IC, the grayscale data stored in the register into the SPI data packet and burning the grayscale data in the SPI data packet to the memory through the SPI transmission lines.

* * * * *